US008287797B2

(12) United States Patent
Voth et al.

(10) Patent No.: US 8,287,797 B2
(45) Date of Patent: Oct. 16, 2012

(54) ELECTRICALLY DRIVEN BLOW MOLDING MACHINE

(75) Inventors: Klaus Voth, Neutraubling (DE); Erik Blochmann, Neutraubling (DE); Frank Winzinger, Regensburg (DE)

(73) Assignee: Krones AG (DE)

( * ) Notice: Subject to any disclaimer, the term of this patent is extended or adjusted under 35 U.S.C. 154(b) by 278 days.

(21) Appl. No.: 12/641,643

(22) Filed: Dec. 18, 2009

(65) Prior Publication Data

US 2010/0156009 A1 Jun. 24, 2010

(30) Foreign Application Priority Data

Dec. 19, 2008 (EP) .................................... 08022103

(51) Int. Cl.
*B29C 49/12* (2006.01)
*B29C 49/56* (2006.01)
(52) U.S. Cl. ................. 264/523; 425/529; 425/541
(58) Field of Classification Search .................. 425/529, 425/541
See application file for complete search history.

(56) References Cited

U.S. PATENT DOCUMENTS

| | | | |
|---|---|---|---|
| 4,128,383 A | 12/1978 | Bond et al. | |
| 5,062,052 A | 10/1991 | Sparer et al. | |
| 5,169,705 A * | 12/1992 | Coxhead et al. | 425/529 |
| 5,269,672 A | 12/1993 | DiGangi, Jr. | |
| 5,346,386 A | 9/1994 | Albrecht et al. | |
| 5,879,726 A | 3/1999 | Hsing | |
| 5,975,881 A | 11/1999 | Langos et al. | |
| 6,053,723 A | 4/2000 | Guiffant et al. | |
| RE36,682 E * | 5/2000 | Carter, Jr. | 264/540 |
| 6,499,988 B1 | 12/2002 | Miura et al. | |
| 6,576,171 B1 * | 6/2003 | Devenoges | 425/529 |
| 6,692,686 B1 * | 2/2004 | Gonda et al. | 425/541 |
| 6,722,868 B1 | 4/2004 | Evrard | |
| 6,918,754 B2 | 7/2005 | Albrecht | |
| 7,131,830 B2 * | 11/2006 | Kobayashi et al. | 425/529 |

(Continued)

FOREIGN PATENT DOCUMENTS

AT 412542 B 4/2005

(Continued)

OTHER PUBLICATIONS

Search Report issued on Jul. 11, 2011 in corresponding European Patent Application No. 10 17 5940.

(Continued)

*Primary Examiner* — Robert B Davis
(74) *Attorney, Agent, or Firm* — Onello & Mello LLP (57) ABSTRACT

An device for molding plastic preforms into plastic containers comprises at least one blow mold and a plurality of closure members interacting with one another in order to transfer the blow mold between an open state and a closed state. The blow mold forms a cavity, within which the plastic preforms may be expanded into the plastic containers. The closure members comprise at least one first mold part and one second mold part, which are moveable with respect to one another. The closure members further comprise a blow nozzle unit which is moveable with respect to the mold parts, and which closes the blow mold in the closed state in one direction. At least one first drive unit moves the mold parts with respect to one another. A second drive unit moves the blow nozzle unit with respect to the mold parts. At least one drive unit moving at least one of the closure members for transferring the blow mold between the closed state and the open state includes an electric drive unit.

22 Claims, 5 Drawing Sheets

U.S. PATENT DOCUMENTS

| | | | |
|---|---|---|---|
| 2001/0043960 A1* | 11/2001 | Castellari | 425/535 |
| 2003/0077352 A1* | 4/2003 | Giacobbe | 425/541 |
| 2003/0138517 A1 | 7/2003 | Albrecht | |
| 2004/0047941 A1* | 3/2004 | Salenbien et al. | 425/526 |
| 2004/0155386 A1 | 8/2004 | Gonda et al. | |
| 2008/0131551 A1 | 6/2008 | Hirata | |

FOREIGN PATENT DOCUMENTS

| | | |
|---|---|---|
| DE | 19528751 A1 | 10/1996 |
| DE | 20007429 U1 | 5/2001 |
| DE | 10253555 B3 | 5/2004 |
| DE | 60003238 | 6/2004 |
| DE | 102006023905 A1 | 11/2007 |
| DE | 102007008023 A1 | 8/2008 |
| EP | 0565917 | 10/1993 |
| EP | 0913244 A1 | 5/1999 |
| EP | 1366885 A1 | 12/2003 |
| EP | 1535719 | 6/2005 |
| FR | 2737436 A1 | 2/1997 |
| FR | 2798093 | 3/2001 |
| JP | 9150419 | 6/1997 |
| JP | 10-193445 A | 7/1998 |
| JP | 2000-218685 | 8/2000 |
| JP | 2002-166467 A | 6/2002 |
| JP | 2008-62554 | 3/2008 |
| WO | 2007134668 A1 | 11/2007 |

OTHER PUBLICATIONS

Office Action issued on Mar. 29, 2012 in corresponding European Patent Application No. 10 175 940.5.

* cited by examiner

PRIOR ART

ELECTRICALLY DRIVEN BLOW MOLDING MACHINE

RELATED APPLICATIONS

This application relies for priority upon European Patent Application No. 08022103.9, filed on Dec. 19, 2008, the contents of which are incorporated herein by reference in their entirety.

BACKGROUND

1. Field

Exemplary embodiments relate to devices for molding plastic preforms into plastic containers and in particular to stretch blow molding machines.

2. Description of Related Art

Stretch blow molding machines have been available for a long time. In conventional stretch blow molding machines, a plastic preform to be molded is placed in a blow mold and is subsequently, for example, by means of pressurized air, expanded against a wall of the blow mold to form a plastic container.

The entire blow molding operation is relatively complex and involves a plurality of process steps. For example, blow mold halves are closed around the preform and also a bottom plate is usually moved up to these blow mold halves. Further, a blow nozzle is positioned at the mouth of the preform and subsequently supplies pressurized air to the preform. It is usually necessary to lock the blow mold around the plastic preform.

In the prior art, all of these mechanical movements are carried out by means of forming cams or guiding cams. These guiding cams offer the advantage that an exactly predetermined course of movement of the individually described movements may be carried out and that a reliable blow molding process is possible even at high operating speeds.

Further, it is known from the prior art to additionally stretch the preforms in their longitudinal direction by means of a stretching rod. To this end, the stretching rod is inserted into the plastic preform during the actual molding process and stretches the preform in its longitudinal direction. In this case, no accurate timing coordination with the mechanical operations mentioned above is required. Instead, however, an accurate timing coordination with the pressurized air supply into the plastic preform is required.

A servo stretching assembly for a blow molding machine is known, for example, described in U.S. Pat. No. 5,269,672, incorporated herein by reference in its entirety. In this assembly, a stretching rod is driven by a servomotor in order to achieve an accurate and repeatable stretching movement.

U.S. Pat. No. 4,128,383, incorporated herein by reference in its entirety, describes an apparatus for controlling the distribution of the plastics material during the production of plastic containers.

A method and a device for blow molding containers described in German Patent Application No. 10 2007 008 023 A1, incorporated herein by reference in its entirety discloses that the positioning of a stretching rod is determined by means of an electromechanical stretching rod drive, wherein a rotational movement of a motor shaft of a servomotor is converted into a lifting movement of the stretching rod by means of a mechanical coupling device.

A rotational stretch blow molding machine having a magnetically driven stretching aid is known, for example, described in German Patent Application No. DE 600 03 238 T2, incorporated herein by reference in its entirety. More specifically, in the case of the blow molding stations known today, as mentioned above, the individual processes are driven by means of cams, for example, a bottom mold is driven up via an outside cam. Subsequently the mold carrier halves are closed via a cam and as soon as they rest against each other, the mold carrier halves are locked by means of a locking mechanism, whereas this operation, too, is carried out by means of a cam. Finally, a blow piston is lowered onto the mold in this condition via another cam, whereby the blow mold is sealed with respect to a high pressure valve. As soon as the blow piston or the blow nozzle is positioned on the blow mold, the stretching operation is initiated via of an additional cam.

In the prior art, however, it is sometimes necessary to convert a blow molding machine to accommodate different container types. To this end, some of the movements described above may have to be altered. To implement such a change, for example, the guiding cams mentioned are exchanged or modified. This may at times be a complex and time-consuming process.

SUMMARY

An object of the inventive concepts is to provide a device for molding plastic preforms, which allows a more rapid conversion, in particular, to accommodate different container types. According to the inventive concepts, this can be achieved by means of an apparatus described herein. Advantageous embodiments and further developments are also described herein.

In accordance with aspects of the inventive concepts, an apparatus that molds plastic preforms into plastic containers comprises at least one blow mold, said device including a plurality of closure members interacting with one another to transfer the blow mold between an open state and a closed state, wherein the blow mold includes a cavity, within which the plastic preforms may be expanded into the plastic containers. Here, the closures have at least one first mold part and at least one second mold part, wherein the at least one first mold part and the at least one second mold part may be moved with respect to one another between a closed position and an open position. Further, the closure members include a blow nozzle unit or a blow piston which is movable with respect to the mold parts and which closes the blow mold in the closed state in one direction. Further, at least one first drive unit is provided in order to move the first and second mold parts with respect to one another. A second drive moves the blow nozzle unit with respect to the mold parts. Further, preferably at least one treatment unit for treating the preforms during the molding process is provided.

According to embodiments, at least one of the first and second drive units is provided for moving at least one of the closure members for transferring the blow mold between the closed state and the open state and/or at least one drive unit for operating a treatment unit for treating the preforms during the molding operation, the at least one drive unit including an electric drive unit and, in particular, an electric motor.

A treatment unit for treating the containers is understood to mean any unit which acts on the containers in a predetermined manner, such as for example a blow nozzle which supplies air to the containers, a stretching rod for stretching the preforms or the drive units for this or indeed a conveyor device such as a clamp for transporting the preforms or the finished containers.

A molding operation is understood to mean not only the actual physical expansion process, but the entire treatment operation starting from the insertion of the preforms into the molding unit up to the removing of the completely molded containers out of the molding unit.

At least one of the elements for transferring the blow mold between an open state and a closed state and/or for treating the containers is operated by means of an electric drive unit. It is, however, also possible that both elements for transferring the blow mold between an open state and a closed state as well as elements for treating the containers are operated by an electric drive unit.

These embodiments are each based on the common concept that elements of the molding device are controlled by electric drives.

Preferably, herein, the closure members mentioned completely close the blow mold or the cavity. The first and the second mold parts are advantageously two mold halves which are, for example, pivoted relative to one another about a common axis and which may, in this way, be folded together or apart from each other. In particular, the blow nozzle unit is not just the blow nozzle itself which supplies pressurized air to the container, but it also includes the sealing means which seal the blow mold in the direction of the blow nozzle for example, towards the top. A drive unit is understood to mean a unit which drives or moves another element, here the components of the blow mold.

In an embodiment, one of these drive units is an electric drive unit and preferably a motor and more specifically an electric motor. This means that here at least one of the closure members mentioned is not moved by means of a guiding cam and is thus moved at best indirectly via a drive of the blow mold, but that the drive unit itself is independent from any guiding cam and the respective movement is carried out by an electric drive unit and in particular by an electric motor.

In general, however, electric drive units may be provided, so that it would also be possible to provide, in addition to or instead of an electric motor, electric elements such as solenoids, piezo motors and the like. A drive unit is understood here to mean not only the electric motor, but also for example a linkage or power transmission means which transmit the driving power of the motor or generally of the electric drive unit to the respective closure member.

In another embodiment, the closure members also comprise a bottom part which is movable with respect to the mold parts and which is in particular movable in a longitudinal direction of the containers to be expanded, in order to close the cavity in one direction. Further, at last a third drive unit for moving this bottom part is also provided. Thus, the cavity is closed in its entirety by the mold parts mentioned, the blow nozzle unit as well as the bottom part. Preferably, the bottom part is moved towards the mold parts, but conversely it would also be possible to move the mold parts towards the bottom part.

Further, the closure members preferably also comprise a locking means which locks the mold parts to one another in the closed state of the blow mold, and also a fourth drive unit for moving this locking means. Thus, in particular during the expansion process, also the two mold parts are locked against each other, so that these two mold parts cannot open relative to one another even under high pressures.

In an embodiment, at least two drive units are provided for moving the closure members in order to transfer the blow mold between the closed state and the open state each have an (electric) motor. Here, preferably at least two electric motors which may be controlled independently from one another are provided, whereby a higher adaptability of such a system is achieved.

It is to be noted here that the term "transfer" from a closed state to an open state also comprises the reverse process, i.e. the transfer from an open state to a closed state. Also, this designation is understood to include processes which lead, for example, from a closed state to a semi-open state or from an open state to a semi-open state of the blow mold.

In an embodiment, at least three drive units are provided for moving the closure members in order to transfer the blow mold between the closed state and the open state are each provided with an (electric) motor. Advantageously, at least four closure members are driven by means of an electric motor.

This procedure is in the first instance by no means a matter of course, since the provision of guiding cams as known from the prior art has proven to be useful and leads to very precise opening and closing operations of the blow mold. It is only if one considers the necessity to convert such systems relatively frequently that it may be prudent to provide one or more of the closure members with an electric motor.

Further, it may however also be advantageous to operate some of the closure members by mechanical means, i.e. by means of lifting cams, and others by means of electric motors.

In an embodiment, the device comprises an electrically operated pressure mechanism in order to apply a mechanical load onto the blow mold. It is known from the prior art that the blow mold is disposed between the two mold parts mentioned above. Further, a pressure pad is provided on the inside of the mold parts, which causes the blow mold to be additionally compressed inside of the mold parts when the mold parts are closed. In this embodiment, it is suggested that this compression operation of the blow mold inside of the mold parts is also carried out by means of an electric drive, for example, using magnets or an electrically operated toggle lever. This electrically operated compression mechanism thus also constitutes a closure member in order to transfer the blow mold between an open state and a (completely) closed state. Thus it would be possible to keep the blow mold halves closed by the attraction provided by a solenoid or to press the blow mold halves together by means of a servo drive via a lever mechanism.

In an embodiment, at least one treatment unit for treating the preforms within the context of the molding process has a stretching rod for stretching the plastic preforms, wherein the stretching rod is movable in a predetermined direction of movement, and a stop element is provided which provides a limit position of this stretching rod in the direction of movement, which stop element may be adjusted in the direction of movement of the stretching rod. This stop element is used to prevent the stretching rod from being excessively lowered during the molding operation so that the preform or the mold bottom might get damaged. Thus, this stop element in particular establishes a bottom position of the stretching rod or that position that represents the completely stretched condition of the container.

This bottom position of the stretching rod herein is also dependent on which kind of container is to be molded, for example, a 0.3 liter container or an 0.5 liter container of different heights. In order to achieve these different adjustments, stop pieces are provided in the prior art. If these stop pieces are inserted into the apparatus, a first end position of the stretching rod is defined. In order to define a second end position of the stretching rod, the corresponding stop piece is removed from the apparatus. This means that only exactly two end positions may be established in the prior art, i.e., by inserting or removing the stop piece.

In an embodiment, this stop element can be implemented to be adjustable or slidable in order to be able to carry out a modification of said end position by sliding this stop element along.

In an embodiment, this adjustability may also be utilized independently from the embodiments described above. Accordingly, in an embodiment, an apparatus for molding plastic preforms includes a stretching rod slidable between two end positions as well as a stop element defining an end position of the stretching rod, wherein a position of this stop element is modifiable in particular in a direction of movement of the stretching rod. It is in particular not necessary herein to remove the stop element from the device if the end position is supposed to be changed.

In an embodiment, an electric drive unit for adjusting this stop element is provided. In providing this electrically operated adjustment of the stop element, it is possible to convert a corresponding system having a plurality of molding devices relatively quickly from one type of container to another type of container. In this way, a replacement of sets may quickly be carried out.

In another embodiment, at least one treatment unit for treating the preforms or containers during a molding operation has a gripping member for gripping the preforms and this gripping member has an electric drive. In an embodiment, this may be an electric drive which operates a catching clamp for the preform. This clamp permits a preform to be fed to the blow mold or the device. Thus, this catching clamp or gripping means, too, constitutes a treatment unit for treating the preforms during the molding operation.

In an embodiment, the device has at least one sensor device which detects a status or value which is characteristic for a molding state as well as at least one control unit which controls at least one drive unit as a response to this status or value.

In an embodiment, this state can be a condition of the container, such as a faulty container. However, this may also be a state of occupation of a clamp by a container, i.e. whether or not a concrete blow mold is occupied by a preform. However, there could also be other operating or material conditions.

Moreover, this state may also be a position of a certain drive unit. Thus, it may be conceivable to carry out a control of several electric drive units also as a function of measured positions of these motors with respect to one another. Besides, as mentioned, also a control as a function of a condition or quality of a container may be considered. In an embodiment, an optimal adaptation of the stretching speed on the basis of the detected values of said stretching rod would be conceivable. These detected values may be transmitted by an inspection unit for the containers via an evaluation unit to the control unit and may be forwarded to the stretching rod drive.

It is possible that the apparatus detects that no preform was transferred to a certain station and that, as a result of that, the drive(s) operating the station concerned receive(s) the instruction not to open this station, so that energy savings may be achieved. Thus, it is also possible not to use this procedure regularly, but only at each $n^{th}$ pitch section, for example at every second pitch section.

Further, vibration measurements may be carried out, on the basis of which it may be detected that the machine is being "rocked up". As a response to such a "rocking up", the electric drive elements or motors (in particular those of the stretching cylinder) may be adjusted in such a way that the effect of "rocking up" is counteracted.

In an embodiment, the movements of at least two closure members are coupled with one another. It is in particular possible here to couple the movement of the bottom part with the movements of the two mold parts. In this respect, it is to be taken into account that the mold parts and the bottom part essentially contribute to the formation of the cavity of the blow mold or to the closure of the blow mold. Thus, these movements are relatively independent from the character or the types of the containers, so that these movements may be coupled with one another. Further, the now coupled elements may preferably be driven by means of an electric motor.

In an embodiment, the mold parts are automatically locked relative to each other. This means that during a closure operation, a movement of the locking device occurs automatically. The same preferably also applies to an unlocking operation, by which the two mold parts are unlocked relative to each other. Here, it is to be noted that a locking operation can be carried out mechanically by means of a control cam or also by means of an electric motor. Conversely, the unlocking operation may be coupled to a movement of the mold parts.

In an embodiment, both the movements of the mold parts and those of the bottom part are coupled and the locking operation of the mold parts is designed to be carried out automatically by the closure of the two mold parts. Herein, all of these mentioned functions are preferably operated by means of a motor, such as an electric motor.

In another embodiment, the device has a control unit for controlling the drive units. In this way it is possible to correlate the individual drive units, in particular the electric motors, in a specified manner with each other, so that the control unit may also take on the function of a mechanical coupling. In this connection it is in particular possible that the apparatus has a decentralised control, i.e. a control unit may be provided which drives a plurality of blow molding stations or which drives in particular electric drives of these blow molding stations.

Thus, the control unit preferably controls the movement of at least one closure member as a function of a movement of a further closure member. Thus, it would be possible that the movement of one closure member is purposefully initiated, whilst the movement of another member is carried out, but it would also be possible that the movement of one closure member follows in particular directly the movement of a further closure member.

In an embodiment, the device has at least one valve unit in order to supply a gaseous medium to the containers, as well as at least one control unit for controlling this valve unit.

In the entire blow molding process, a plurality of different pressures are applied to the containers to be expanded, and to this end, different valves are used. In this respect, it is partly established in an accurate way in which order the individual valves are switched, in order to feed the containers with the various pressures. These pressure application processes may be controlled by means of a further control unit.

Preferably, the control unit mentioned controls both the valve units and the drive units. Thus, it is possible that the abovementioned controller is coupled with a controller of the valves which are in particular implemented as high pressure valves, i.e. the complete blow molding station has its own control for all of the electric drives and valves. This procedure is particularly advantageous since for example different process parameters may be stored in a memory of this control unit, and on the basis of these process parameters, both the valves and the closure members may be controlled. During a conversion from one product type to another, completely new parameter sets may be loaded, and in this way a corresponding device may be converted within a very short period of time.

In an embodiment, the device has a plurality of blow molding stations with blow molds, which are carried along a support. Advantageously, the blow molding stations are here carried, at least in sections, along a circular path. In this case, the support may for example be a carousel on which preferably also the individual closure members and the control units are disposed.

In an embodiment, the apparatus has at least one stretching rod for stretching the plastic preforms. This stretching rod, too, is preferably driven here by an electric motor. The control of this electric motor, too, may be integrated into the above-mentioned control unit.

In this respect, it is possible for the closure members mentioned to be driven by an electric motor directly or immediately, however, it would also be possible that the drive is implemented in particular by means of a drive train including interposed gear elements.

The inventive concepts further relate to a method for molding plastic preforms into plastic containers comprising positioning the plastic performs in a blow mold and providing a plurality of closure members that interact with each other in order to transfer the blow mold from an open state to a closed state, wherein the blow mold forms a cavity, inside of which the plastic preforms are expanded into plastic containers. Here, the closure members have at least one first mold part and one second mold part. The first mold part and the second mold part are moved between the closed position and the open position with respect to one another. The closure members further have a blow nozzle unit which is moved with respect to the mold parts, in order to close the cavity in one direction. At least one first drive unit moves the mold parts with respect to one another and a second drive unit moves the blow nozzle with respect to the mold parts. According to the inventive concepts, at least one of the closure members is moved by an electric drive unit and, in an embodiment, is moved by an electric motor.

In an embodiment, at least two closure members are moved by at least one electric drive unit. In an embodiment, the electric drive unit includes an electric motor.

BRIEF DESCRIPTION OF THE DRAWINGS

The foregoing and other objects, features, and advantages of the inventive concepts will be apparent from the more particular description of preferred embodiments of the inventive concepts, as illustrated in the accompanying drawings in which like reference characters refer to the same parts throughout the different views. The drawings are not necessarily to scale, emphasis instead being placed upon illustrating the principles of the inventive concepts. In the drawings.

DETAILED DESCRIPTION OF EMBODIMENTS

Figures 1, 2:
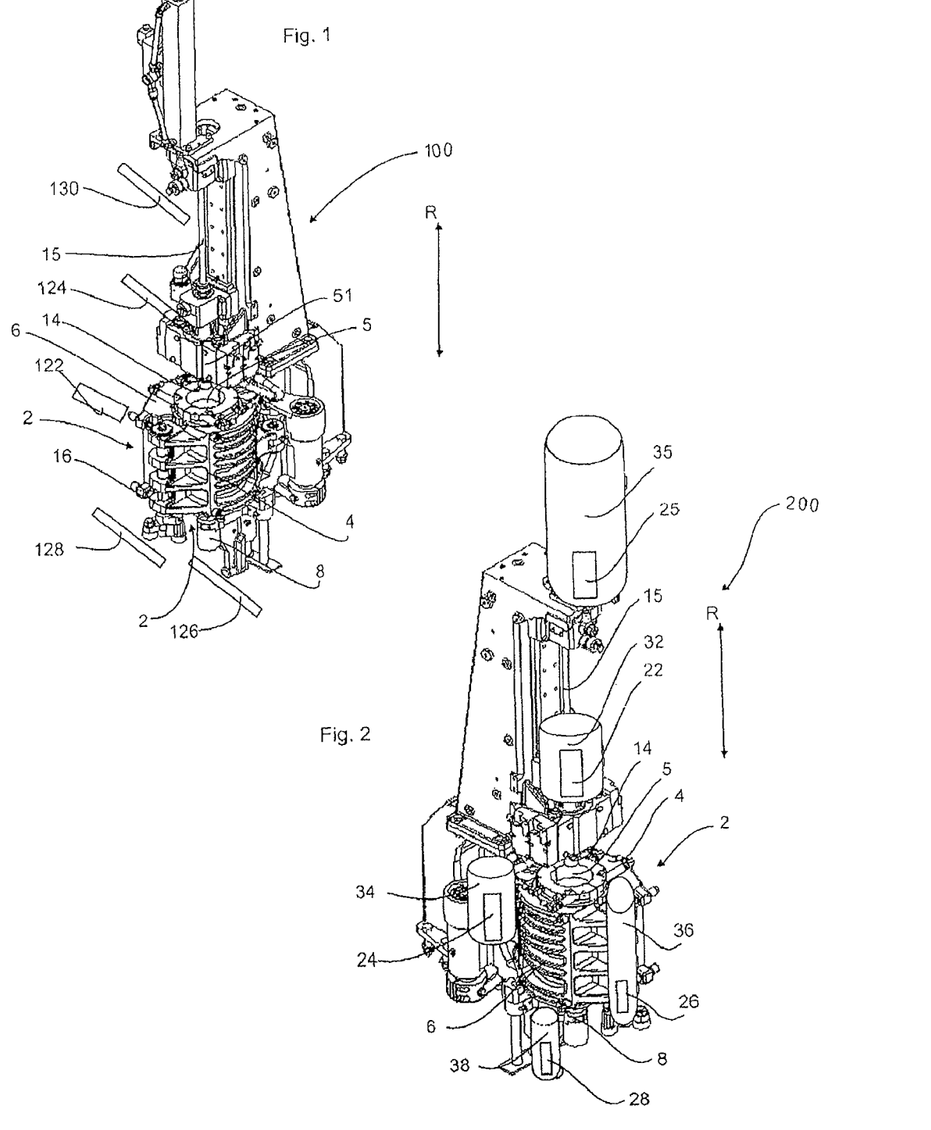
FIG. 1 shows a conventional device for molding plastic preforms.
FIG. 2 shows a device according to an embodiment.

FIG. 1 shows a conventional device 100 for molding containers from plastic preforms (not shown). The device 100 includes a blow mold 2. In an embodiment, the blow mold 2 comprises a first mold part 4 and a second mold part 6 which may be pivoted against each other about a pivot axis (obscured). In a folded state shown in FIG. 1, a cavity 5 is formed by the two mold parts 4 and 6, within which the preforms may be expanded by applying pressure to the containers.

Reference numeral 16 refers to a locking rod which is used for locking the two mold parts 4 and 6 against one another. Further, a blow nozzle 14 is shown which is placed on a mouth of the containers during the blow molding operation, in order to apply pressurized air thereto. Moreover, a stretching rod 15 may also be provided, which is lowered downwards during the actual molding operation and thus expands the preform (not shown) in the longitudinal direction thereof, for example, a direction of movement R. Further, the apparatus also has a bottom part 8 which is moved towards the two mold parts 4, 6 from below during the closure of the blow mold 2. In the prior art, various guiding cams 122, 126, 128, 124 and 130 are used, in order to control the movement of individual closure members, such as mold parts 4, 6, bottom part 8, blow nozzle 14, and stretching rod 15. These guiding cams, however, are only schematically illustrated. Reference numeral 51 refers to a valve block in which a plurality of valves are disposed, in order to control the supply of pressurized air to the preforms. The reference letter R identifies a direction of movement of the stretching rod 15.

FIG. 2 shows a device 200 according to an embodiment. In FIG. 2, a plurality of drive units 22, 24, 26, 28 and 25 which are only schematically shown are provided, which are used to carry out the movement processes illustrated in FIG. 1. Thus, a drive unit 22 is used as a drive in order to lower a blow nozzle 14 downwards onto a blow mold 2. A drive 26 is used to rotate a rod, for example, rod 16 shown in FIG. 1, which is not shown in FIG. 2, and thus to effect a locking of two mold parts 4 and 6. A drive 28 is used for lifting or lowering a bottom part 8. A drive unit 24 is used for opening and closing a mold carrier or for pivoting the two mold parts 4 and 6. Drive unit 25 is used for moving a stretching rod, for example, in a longitudinal direction. In the embodiment shown in FIG. 2, the drive units 22, 24, 26, 28, and 25 are each driven by motors, specifically electric motors 36, 34, 38, 32 and 35, respectively. In this way, in the embodiment shown in FIG. 2, any guiding cams may be completely dispensed with and in this way the entire driving operation is controlled by electric motors.

However, it is to be noted that it would also be possible to leave individual guiding cams as shown in FIG. 1 and to provide only some electric motor drives.

Figures 3, 4A:
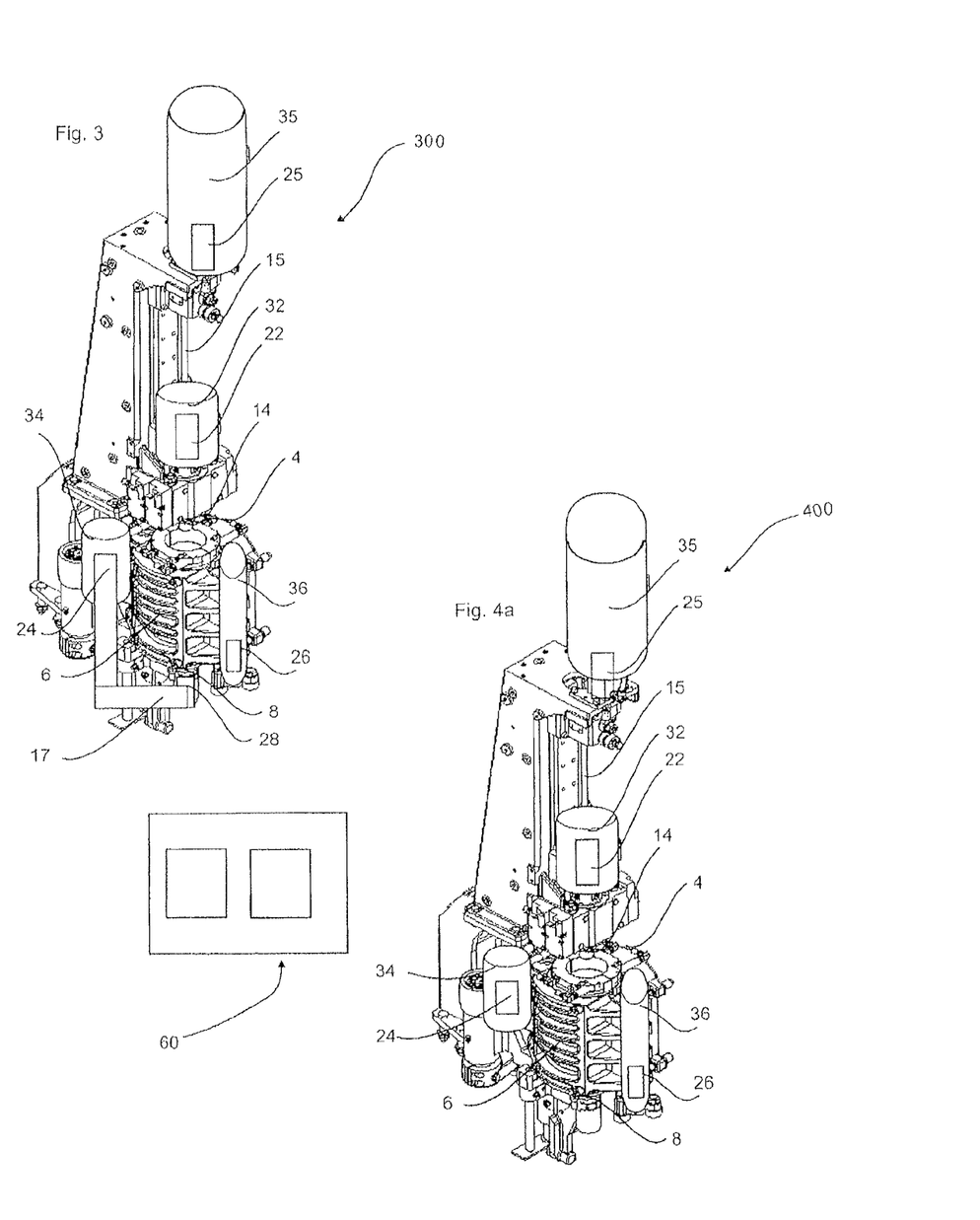
FIG. 3 shows a device according to an embodiment.
FIG. 4a shows a device including a controller according to an embodiment.

FIG. 3 shows a device 300 according to an embodiment. In an embodiment, the electric motor 38 shown in FIG. 2 is not present, but the movement of the bottom part 8 is coupled to the opening and closing movements of the two mold parts 4 and 6. To this end, in an embodiment, a coupling unit 17 is provided which couples the drive unit 24 with the drive unit 28. However, it would also be possible here for the coupling unit 17 itself to be directly used as a drive unit for the bottom part 8, i.e. for lifting and lowering the bottom part 8.

Moreover, it would also be possible for the drive unit 36 or the electric motor 26 to be used only for unlocking the two mold parts and the locking operation to be coupled to the movements of the mold parts. Conversely, also the locking operation may be caused by the drive unit 26 and the unlocking operation may be coupled to a movement of the mold parts 4, 6. However, also other coupling mechanisms would be conceivable, for example, between the drive unit shown in FIG. 2 and the drive unit 28. In general, principally any desired coupling of the individual drive units 22, 24, 26, 28 and 25 is conceivable, depending on the respective application.

FIG. 4a shows a device 400 including a controller 60 according to an embodiment. In an embodiment, the controller 60, also referred to as a control unit, controls the individual motors 32, 34, 36, 38 and 35. The control unit 60 can access certain process data and may thus control the individual electric motors also in coordination with one another. In an embodiment, one or more of the electric motors 32, 34, 35, 36, 38 can be servo motors.

Figure 4B:
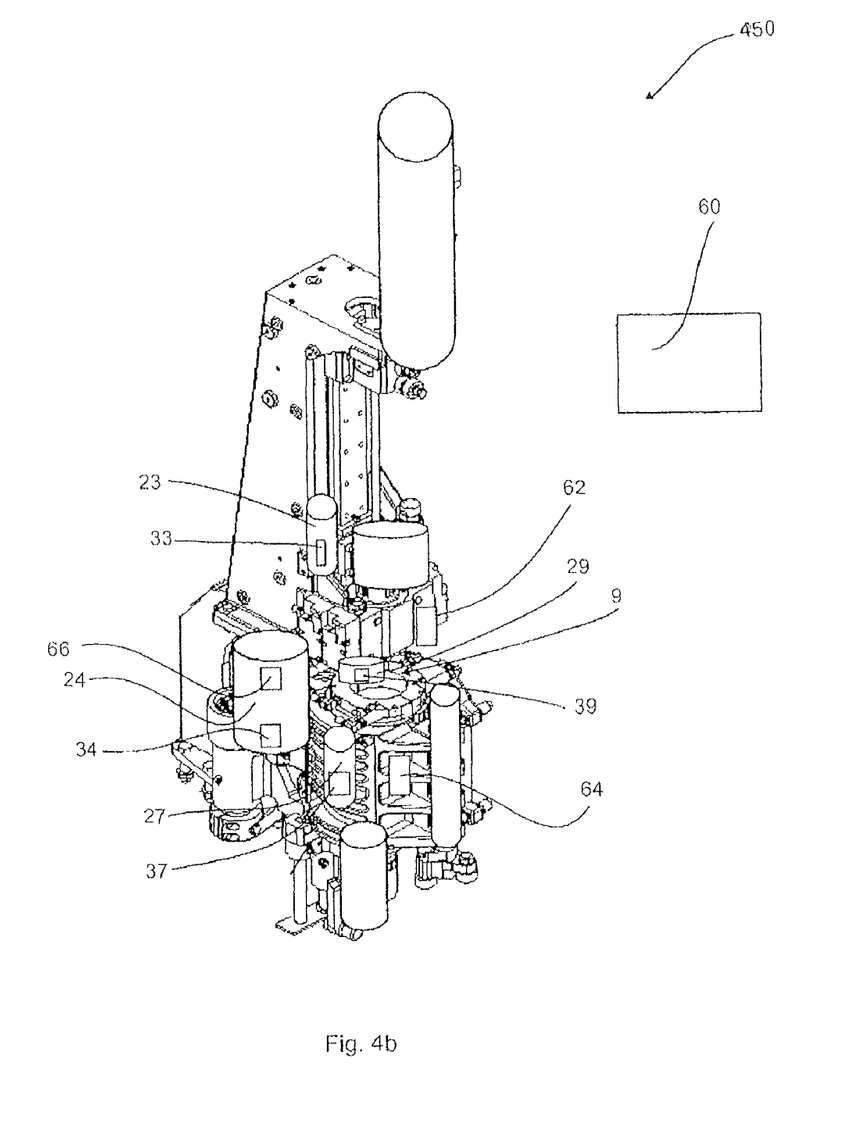
FIG. 4b shows a device according to an embodiment.

FIG. 4b shows a device 450 according to another embodiment. For reasons of clarity, some of the reference numerals have been omitted here. According to the embodiment shown in FIG. 4b, a drive unit 29 is provided which operates a clamp 9 which feeds the preforms to the blow mold. This drive unit 29 has an electric motor 39. Reference numeral 23 identifies a drive unit for adjusting a stretching stop, or more specifically, a stop element (not shown) which determines a bottom position of the stretching rod. Drive unit 23 likewise has an electric motor 33. However, it would also be possible to adjust this stretching stop in a different way, for example, manually. In other embodiments, the stretching stop can be adjusted by a lever.

Reference numeral 27 identifies a drive unit for compressing the blow mold inside of the mold parts 4, 6. This drive unit here has a solenoid 37, however, the use of an electric motor would also be conceivable.

Further, sensor devices 62, 64, 66 are present, which detect conditions of the device. More specifically, the sensor unit 62 is a sensor which may detect a state of occupation of a clamp by a container, or a sensor which detects an opening or closing position of the clamp.

Reference numeral 64 identifies a sensor device which detects a condition of the containers, for example, an optical sensor which checks the containers for damages. However, it would also be possible to provide a sensor which detects for example a pressure inside the containers during the molding operation.

Sensor device 66 detects here a position of the motor 34 of the drive unit 24. Corresponding sensors may also be provided here in the other drive units. These sensors forward their measuring data to the control unit 60. On the basis of this measuring data, the individual drives 22-29 or their motors may be controlled. In this way, a control mechanism is suggested and the individual motors 32-39 or drive means will respond in different ways as a function of the measured values.

The control variables for this control mechanism may include an oscillation amplitude, a quality of the preforms, the presence of preforms in the blow mold, an torque transfer (for detecting a break of the mold carrier) or the like. Any possible manipulation variables for the control mechanism are for example the timings of the motor control or the solenoid control or the torques or speeds of the electric motors.

Figure 5:
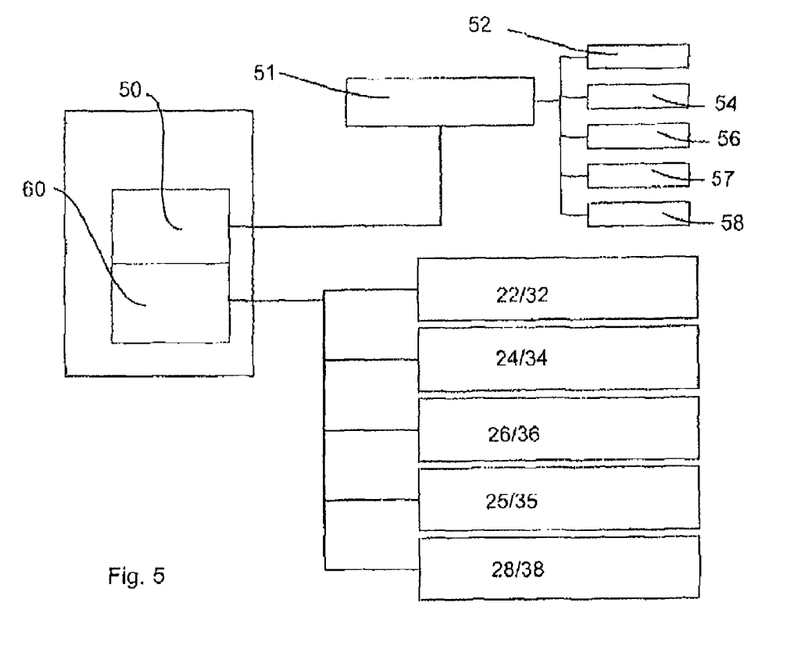
FIG. 5 shows a block diagram of a device according to an embodiment.

FIG. 5 shows a block diagram of a device according to an embodiment. Here again, a control unit 60 is provided which controls individual drives 22, 24, 26, 25, 28 and/or their electric motors 32, 34, 36, 38, 35. Apart from that, an additional control unit 50 is provided which controls different valves, in particular high pressure valves 52, 54, 56, 57, 58, via a valve block 51. The two control units 50 and 60 communicate with each other so that in this way the entire blow molding process including all of the movements of the blow mold may be consistently controlled. In this way it is in particular also possible to integrate the control of the valves 52-58 into the control of the individual electric motors, and, in an embodiment, to not allow the supply of air via the valves until the two mold parts 4, 6 are closed and locked.

Figure 6:
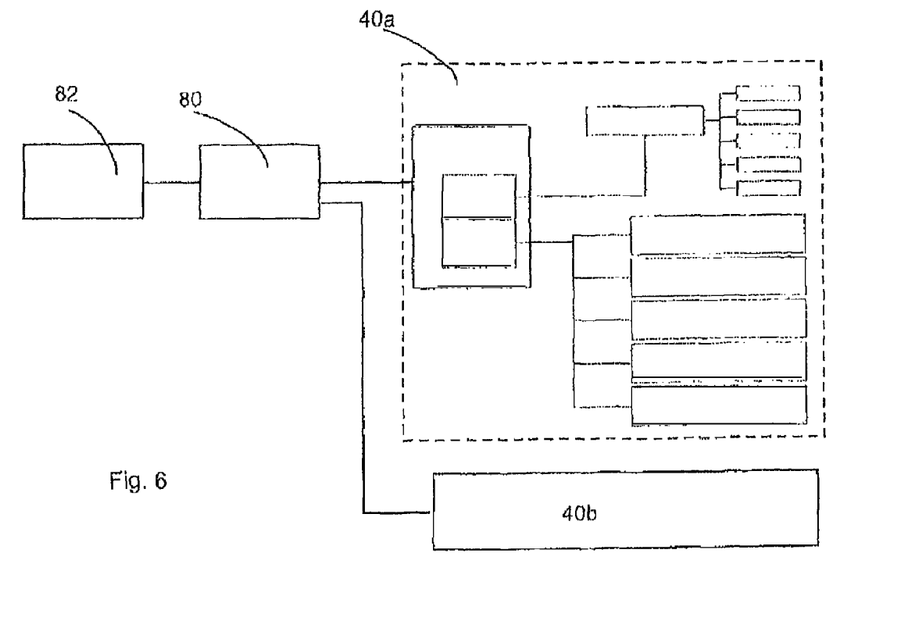
FIG. 6 shows a block diagram illustrating a controller according to an embodiment.

FIG. 6 shows a block diagram illustrating a controller according to an embodiment. Here, block 40a shown in dotted lines relates to the device shown in FIG. 5, and thus refers to the control of an individual blow molding station. A system for molding containers, however, usually has a plurality of such blow molding stations which may for example be disposed on a transport carousel. In this case, reference numeral 40b relates to another blow molding station.

Reference numeral 80 identifies a central control unit which controls the individual blow molding stations 40a, 40b. Reference numeral 82 relates to the blow molding machine in general, which in turn may be integrated into a higher-level system, which higher-level system may be additionally provided with heating means for heating the preforms, downstream filling machines and the like.

Figure 7A:
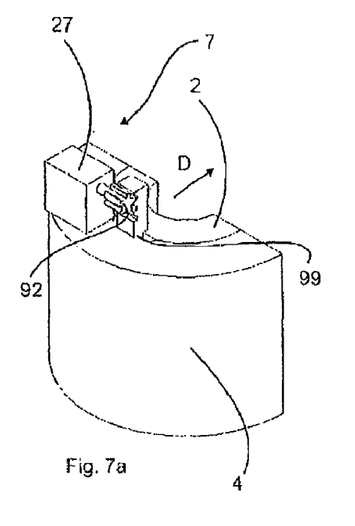
FIGS. 7a-7d show four illustrations of a pressure mechanism according to embodiments.
Figure 7B:
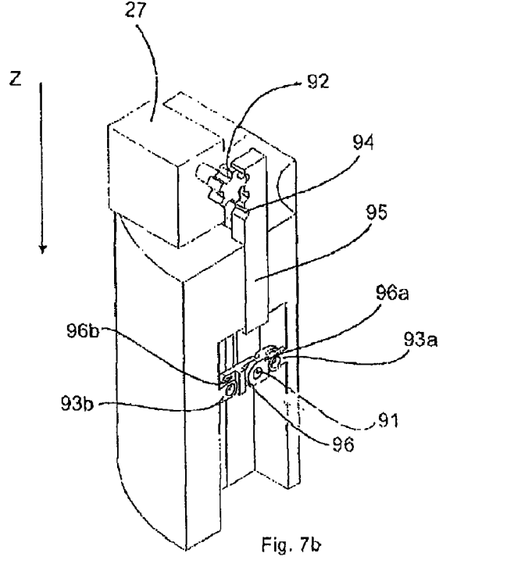
Figure 7C:
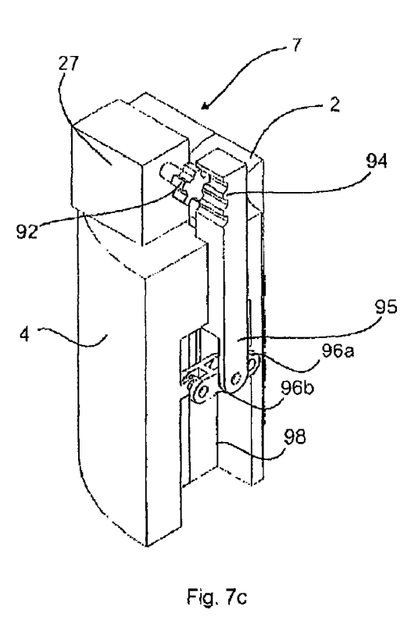
Figure 7D:
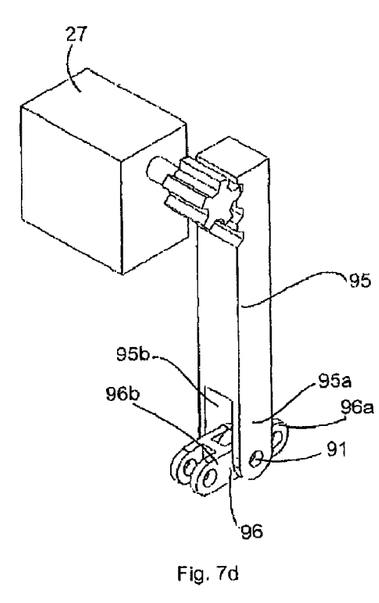

FIGS. 7a-7d show four illustrations of a pressure mechanism according to embodiments. In particular, FIGS. 7a-7d show an embodiment wherein a blow mold 2, which can be formed of two pieces, is loaded by a pressure mechanism 7. FIG. 7a shows a mold part 4, inside of which the blow mold 2 is disposed. A corresponding second mold part and the second blow mold half of the blow mold 2 are not shown.

During production of the containers, it is preferable that the blow mold 2 is compressed in addition to the mold parts 4, 6 being locked to each other, so that any unevenness that may occur particularly at the transitions between the two blow mold halves may be kept as small as possible, in order to ensure that the finished container is formed as smooth as possible in these areas. For this reason, it is advantageous to load the blow mold inside of the mold parts in a mechanical way, or more specifically, to move the blow mold half shown in FIG. 7a in a compression direction D towards the other blow mold half (not shown).

To this end, the pressure mechanism 7 shown in FIG. 7a is provided. This pressure mechanism is here advantageously positioned between the mold part 4 and the blow mold 2, and particularly preferably in the circumferential direction of the mold part 4 essentially at the center thereof.

It is to be noted that the pressure mechanism 7 shown in FIGS. 7a-7d may also be used independently from the device as illustrated in this application. A corresponding molding unit therefore includes a first mold part 4 and a second mold part 6, which first mold part 4 and second mold part 6 may be moved relative to one an other between a closed position and an open position. Further, a blow mold is disposed in a closed position between this first mold part 4 and the second mold part 6, and a pressure mechanism is provided which, when the mold parts 4, 6 are closed, applies pressure onto the blow mold with respect to the mold parts 4, 6.

This pressure mechanism is a mechanically acting pressure mechanism which has at least one lever element 96 which interacts both with the mold part 4 and with the blow mold 2, in order to apply pressure onto the blow mold.

In the prior art, pressure pads are usually used for the purpose of this pressure application, which are disposed between the mold part 4 or the mold carrier and the blow mold 2. These pressure pads cause the blow mold to be compressed inside of the two mold parts once the mold parts 4, 6 have been closed.

In an embodiment, a lever mechanism can be provided that interacts both with the mold part and with the blow mold, in order to compress the blow mold 2, more specifically the blow mold halves 2 inside of the mold parts 4, 6.

Preferably, the pressure mechanism includes a transfer bar 95, which couples a drive unit 27 with the lever element 96. Preferably, a drive unit 27 (which specifically acts mechanically) is generally disposed here for exercising pressures outside of the mold parts 4, 6. In a further advantageous embodiment, the transfer bar 95 is movable in a longitudinal direction of the containers to be expanded or in the direction in which the stretching rod may be moved. In a further advantageous embodiment, a recess for receiving the transfer bar 95 is formed between an internal wall of the mold part 4 and the blow mold. Thus, in an embodiment, the entire pressure mechanism is formed within the mold part 4. Thus, when removing the blow mold from the mold part 4, essentially no separation of the pressure mechanism is required.

Preferably, the lever element 96 has at least one lever member 96a which may be pivoted with respect to the transfer bar 95 and which may be coupled either with the mold part 4 or with the blow mold 2. Preferably, the lever element 96 has two lever members 96a, 96b which are pivotable with respect to the transfer bar 95, with one of these movement members being coupled with the mold part 4 and the other lever member 96a being coupled with the blow mold 2. By means of a suitable pivoting of the lever members, the mold part 4 and the blow mold 2 are pressed apart from each other.

In this connection, the lever members 96a, 96b are preferably pivotable in one plane which is formed by a radial direction of the blow mold 2 and the mentioned longitudinal direction of the containers. In another embodiment, the two lever members 96a, 96b, too, may be pivoted with respect to one another. Advantageously, also the two lever members 96a, 96b may each be pivoted with respect to the mold part or the blow mold. Thus it is possible that a lever member 96b is hinged to the mold part 4 and the other lever member 96a is hinged to the blow mold 2. By means of a movement of the transfer bar 95, the two hinge positions are prised apart, and in this way the blow mold 2 is pushed away from the mold part.

Preferably, the transfer bar 95 is here guided only with respect to the mold carrier or the mold part 4. In moving the two lever members 96a, 96b, it is possible that the path of the mold parts 4, 6 with respect to the blow mold 2 may be overcome by pressing of the blow mold 2 with a high force. This travel path extends, for example, over a range of between 0.1 mm to 0.9 mm, preferably of from 0.2 mm to 0.8 mm, particularly preferably of approx. 0.3 mm. The lever members 96a, 96b are here preferably implemented as a toggle lever mechanism, since only a very slight adjustment travel is necessary to transmit great forces.

In order to move the transfer bar 95, an electric drive 27 is used. In other embodiments, it is possible to use a cam for moving the transfer bar 95. An electric drive offers the advantage that any over-pressing of the levers and molds may more easily be prevented.

However, also other types of transmissions or lever ratios are possible, for example an eccentric bearing of the long lever on the servo shaft. In view of the small lever member 96a on the mold carrier, the rotary bearing might be dispensed with, and instead a linear plain bearing guide might be attached, along the left hand side of which the lever might slide down, until it is wedged between the mold carrier 4 and the mold carrier shell (similar to a toggle lever).

The reference numerals 93a and 93b refer to hinging projections which are each formed on the mold part 4 and the blow mold 2, respectively, and to which the two lever members 96a, 96b (preferably via pivoting shafts which are not shown) are hinged. Reference numeral 91 identifies a hinging position in which the two lever members 96a, 96b are hinged with respect to the transfer bar 95.

Preferably, a stop means 99 (see FIG. 7a) is provided which ensures that the transfer bar 95 may be inserted into the mold part 4 only up to a certain position. Further, it would also be possible to limit a travel path of the transfer bar, which is here formed as a rack 95 having toothing 94, by means of the toothing. This toothing 94 interacts with a drive gear 92.

In a further embodiment, apart from the lever element 96a, 96b, further lever elements 96a, 96b (not shown) may be provided one after another in the direction Z, so that a load may be applied to the blow mold 2 in a more even manner. Advantageously at least two, particularly preferably at least three of the lever elements 96, 96b shown are each disposed on the transfer bar 95. Reference numeral 98 (see FIG. 7c) relates to a recess formed in the mold part 4, within which the lever element 96a, 96b is disposed. The transfer bar 95 has two projections 95a, 95b, between which the lever elements 96a, 96b may be pivotably located. The drive unit 27 is preferably fixedly disposed on the mold part 4.

It would be possible to provide a corresponding pressure mechanism 7 also on the second mold part 6. Preferably, however, it is sufficient to provide only one such pressure mechanism 7 on either of the two mold parts. The two lever members 96a, 96b are preferably rigidly formed for power transmission.

In another embodiment, the transfer bar 95 is formed on an end side (not shown) which is essentially wedge-shaped. Wedge-shaped surfaces are formed on the mold part 4 and the blow mold 2 as a counter contour relative to the tip of the transfer bar. Any movement of the wedge-shaped surfaces relative to one another causes the blow mold 2 and the mold part 4 to be clamped together. The blow mold 2 will thus clamp itself against the mold part 4.

In a further advantageous embodiment, the servo shaft is disposed parallel to the axis of the transfer bar 95. A travel thread (not shown) is provided on the transfer bar, which is in engagement with a travel thread provided on the servo shaft. Thus, a transmission of force may be achieved without interposing a gear system.

In the light of these embodiments it will be appreciated that the mechanism for pressing the blow mold halves 2 against each other may also be attached between the mold carrier and a shell in which the actual blow mold is supported.

All of the features disclosed in the application document are claimed as being essential to the invention, in as far as they are novel compared to the prior art, either individually or in combination.

What is claimed is:

1. A device for molding plastic preforms into plastic containers, comprising:
   at least one blow mold;
   a plurality of closure members interacting with each other to transfer the blow mold between an open state and a closed state, wherein the blow mold includes a cavity within which the plastic preforms may be molded into the plastic containers, wherein the closure members comprise:
      at least one first mold part;
      at least one second mold part, wherein the at least one first mold part and the at least one second mold part are moveable with respect to one another between the closed state and the open state; and
      a blow nozzle unit which is moveable with respect to the at least one first mold part and the at least one second mold part and which is positioned over the cavity in the closed state of the blow mold;
   at least one first drive unit that moves the at least one first mold part and the at least one second mold part with respect to one another;
   a second drive unit that moves the blow nozzle unit with respect to the at least one first mold part and the at least one second mold part, wherein at least one of the first and second drive units moves at least one of the closure members to transfer the blow mold between the closed state and the open state; and at least one treatment unit that treats the preforms during the molding operation, wherein at least one drive unit for moving at least one of the closure members for transferring the blow mould between the closed state and the open state or at least one drive unit for operating the treatment unit is an electric drive unit, wherein the device comprises an electrically operated pressure mechanism that applies a mechanical load to the blow mold, and wherein the pressure mechanism comprises a lever element.

2. The device as claimed in claim 1, wherein the entire pressure mechanism is formed in at least one of the first mold part and the second mold part.

3. The device as claimed in claim 1, wherein the lever element interacts with both the at least one of the first and second mold parts and with the blow mold.

4. A device for molding plastic preforms into plastic containers, comprising:

at least one blow mold;

a plurality of closure members interacting with each other to transfer the blow mold between an open state and a closed state, wherein the blow mold includes a cavity within which the plastic preforms may be molded into the plastic containers, wherein the closure members comprise:

at least one first mold part;

at least one second mold part, wherein the at least one first mold part and the at least one second mold part are moveable with respect to one another between the closed state and the open state; and a blow nozzle unit which is moveable with respect to the first and second mold parts and which is positioned over the cavity in the closed state of the blow mold;

at least one first drive unit that moves the first and second mold parts with respect to one another;

a second drive unit that moves the blow nozzle unit with respect to the at least one first and second mold parts, wherein at least one of the first and second drive units moves at least one of the closure members to transfer the blow mold between the closed state and the open state;

at least one treatment unit that treats the preforms during the molding operation, wherein at least one third drive unit for moving at least one of the closure members for transferring the blow mould between the closed state and the open state or at least one drive unit for operating the treatment unit is an electric drive unit; and a locking unit which locks the first and second mold parts to one another in the closed state of the blow mold, wherein the device further comprises at least one fourth drive unit for moving the locking unit, and wherein the device has a control unit for controlling the first through fourth drive units and which controls the locking unit independent of the movement of a further closure member.

5. The device as claimed in claim 4, wherein at least two drive units of the first through fourth drive units move at least one of the closure members to transfer the blow mold between the closed state and the open state, and wherein the at least two drive units have one electric motor each.

6. The device as claimed in claim 4, wherein at least three drive units of the first through fourth drive units move at least one of the closure members to transfer the blow mold between the closed state and the open state, and wherein the at least three drive units have one electric motor each.

7. The device as claimed in claim 4, wherein the control unit controls the movement of at least one closure member of the plurality of closure members as a function of the movement of a different closure member of the plurality of closure members.

8. The device as claimed in claim 7, wherein the control unit controls the at least one closure member and the different closure member.

9. The device as claimed in claim 4, wherein the device has at least one valve unit in order to supply a gaseous medium to the containers as well as at least one control unit for controlling the valve unit.

10. The device as claimed in claim 9, wherein the at least one control unit controls both the at least one valve unit and the first through fourth drive units.

11. The device as claimed in claim 4, wherein the device has a plurality of blow molding stations with blow molds, which are guided along a support.

12. The device as claimed in claim 4, wherein the device has at least one stretching rod for stretching the plastic preforms.

13. The device as claimed in claim 4, wherein the device has one electrically operated pressure mechanism that applies a mechanical load to the blow mold.

14. The device as claimed in claim 4, wherein the at least one treatment unit for treating the preforms during a molding operation has a stretching rod for stretching the plastic preforms, wherein the stretching rod is moveable in a predetermined direction of movement, and wherein a stop element determines an end position of the stretching rod in a direction of motion, wherein the stop element is adjustable in the direction of motion of the stretching rod, and wherein an electric drive unit adjusts the stop element.

15. The device as claimed in claim 4, wherein the at least one treatment unit for treating the preforms during a molding operation comprises a gripping member for gripping the preforms, wherein the gripping member has an electric drive.

16. The device as claimed in claim 4, wherein the device has at least one sensor device which detects a condition which is characteristic for a molding condition, and has at least one control unit which controls at least one drive unit as a response to the condition.

17. The device as claimed in claim 4, wherein the movements of at least two closure members of the plurality of closing members are coupled with one another.

18. A method for molding plastic preforms to plastic containers, comprising:

positioning the plastic preforms in a blow mold;

providing a plurality of closure members that interact with each other in order to transfer the blow mold from an open state to a closed state, wherein the blow mold forms a cavity, inside of which the plastic preforms are expanded into plastic containers, wherein the closure members comprise at least one first mold part, at least one second mold part, and a blow nozzle unit;

moving the at least one first mold part and the at least one second mold part with respect to each other between the closed position and the open position;

moving the blow nozzle unit with respect to the first and second mold parts in order to close the cavity in one direction;

providing at least one first drive unit that moves the mold parts with respect to one another;

providing a second drive unit that moves the blow nozzle unit with respect to the mold parts;

operating, by at least one closure member of the plurality of closure members or at least one third drive unit, a treatment unit for treating the preforms during a molding operation, the at least one closure member moved by an electric drive unit comprising an electric motor; and applying, by an electrically operated pressure mechanism comprising a lever element, a mechanical load to the blow mold.

19. The method as claimed in claim 18, wherein at least two closure members are moved by means of electric drive units comprising electric motors.

20. The device of claim 4, wherein the closure members further comprise a bottom part, which is moveable with respect to the first and second mold parts in order to close the cavity in one direction, and wherein the device further comprises at least one third drive unit for moving the bottom part.

21. A device for molding plastic preforms into plastic containers, comprising:
   at least one blow mold;
   a plurality of closure members interacting with each other to transfer the blow mold between an open state and a closed state, wherein the blow mold includes a cavity within which the plastic preforms may be molded into the plastic containers, wherein the closure members comprise:
      at least one first mold part;
      at least one second mold part, wherein the at least one first mold part and the at least one second mold part are moveable with respect to one another between the closed state and the open state; and
   a blow nozzle unit which is moveable with respect to the first and second mold parts and which is positioned over the cavity in the closed state of the blow mold;
   at least one first drive unit that moves the first and second mold parts with respect to one another;
   a second drive unit that moves the blow nozzle unit with respect to the at least one first and second mold parts, wherein at least one of the first and second drive units moves at least one of the closure members to transfer the blow mold between the closed state and the open state;
   at least one treatment unit that treats the preforms during the molding operation, wherein at least one third drive unit for moving at least one of the closure members for transferring the blow mould between the closed state and the open state or at least one fourth drive unit for operating the treatment unit is an electric drive unit; and
   at least one valve unit that supplies a gaseous medium to the containers, wherein:
      the device has a control unit for controlling at least one of the at least one valve unit and the at least one of the first through fourth drive units;
      the device has at least one stretching rod for stretching the plastic preforms, the stretching rod being driven by an electric motor;
      the device has at least one sensor device which detects a condition which is characteristic for at least one of a molding condition and a condition which is characteristic for a occupation state with a preform; and
      the control unit controls at least one drive unit of the first through fourth drive units in response to the condition.

22. A device as claimed in claim 21, wherein the control device controls both the valve unit and the electric motor for driving the stretching rod.

* * * * *